United States Patent [19]

Okazaki et al.

[11] Patent Number: 5,421,618

[45] Date of Patent: Jun. 6, 1995

[54] PLASTIC CARD PROVIDED WITH MAGNETIC STRIPE

[75] Inventors: Masaaki Okazaki; Yoshiki Sasaki; Koji Kitami, all of Tokyo, Japan

[73] Assignees: Dai Nippon Printing Co.; JCB Co., Ltd., both of Japan

[21] Appl. No.: 312,659

[22] Filed: Sep. 27, 1994

Related U.S. Application Data

[63] Continuation of Ser. No. 186,909, Jan. 27, 1994, abandoned.

[30] Foreign Application Priority Data

Feb. 2, 1993 [JP] Japan .................................. 5-015558

[51] Int. Cl.$^6$ .............................................. B42D 15/02
[52] U.S. Cl. ........................................ 283/82; 283/86; 283/91; 283/94; 283/109; 283/904; 235/457; 359/3
[58] Field of Search ................... 235/457, 449, 493; 283/82, 83, 91, 94, 107, 109, 904, 86; 359/3

[56] References Cited

U.S. PATENT DOCUMENTS

| | | | |
|---|---|---|---|
| 3,610,721 | 10/1971 | Abramson et al. | 359/5 |
| 4,081,132 | 3/1978 | Pearce | 235/493 |
| 4,090,662 | 5/1978 | Fayling | 235/493 |
| 4,376,887 | 3/1983 | Greenaway et al. | 235/457 X |
| 4,396,886 | 8/1983 | Koester et al. | 235/449 X |
| 4,631,222 | 12/1986 | Sander . | |
| 4,641,017 | 2/1987 | Lopata | 235/457 |
| 4,684,795 | 8/1987 | Colgate, Jr. | 235/457 |
| 4,762,759 | 8/1988 | Vermeulen et al. | 430/1 |
| 4,856,857 | 8/1989 | Takeuchi et al. | 283/904 X |
| 5,003,409 | 3/1991 | Ishiguro et al. . | |
| 5,010,243 | 4/1991 | Fukushima et al. | 283/86 X |
| 5,211,770 | 5/1993 | Ishiguro et al. . | |
| 5,224,090 | 6/1993 | Umeda et al. | 369/284 |

FOREIGN PATENT DOCUMENTS

0286738 10/1988 European Pat. Off. .

OTHER PUBLICATIONS

Patent Abstracts of Japan, P Field, vol. 6, No. 84, May 22, 2982—JP-A-57-20903.

*Primary Examiner*—Frances Han
*Attorney, Agent, or Firm*—Parkhurst, Wendel & Rossi

[57] ABSTRACT

A plastic card provided with a magnetic stripe, which is very difficult to forge or alter and, even tough subjected to forgery or alteration, enables the forgery or alteration to be easily detected in appearance.

The plastic card comprises a card substrate and a hologram-magnetic stripe comprising, provided on said card substrate in the following order, an adhesive layer, a first magnetic recording layer, a second magnetic recording layer, a metallic reflecting layer and a hologram forming layer. The first magnetic recording layer and the second magnetic recording layer are such that one of the magnetic recording layers has a coercive force at least twice as high as the other magnetic layer and a Curie point at least 100° C. below the other magnetic layer and, when the magnetic recording layers are heated at a temperature in the range of from the lower Curie point to 30° C. below the lower Curie point, they become substantially identical to each other in saturation writing current value.

1 Claim, 2 Drawing Sheets

PLASTIC CARD PROVIDED WITH MAGNETIC STRIPE

This is a continuation of application Ser. No. 08/186,909, filed Jan. 27, 1994, now abandoned.

BACKGROUND OF THE INVENTION

The present invention relates to a plastic card provided with a magnetic stripe and particularly to a plastic card provided with a magnetic stripe, comprising a magnetic recording layer having a structure of two layers different from each other in magnetic properties and a reflection hologram.

As opposed to other cards, such as prepaid cards, in plastic cards provided with a magnetic stripe, which are delivered to users after intensive issuing (encoding) at a particular place, the stored data are not rewritten after issuance and only reading is effected. Conventional plastic cards provided with a magnetic stripe for such applications have such a construction that a magnetic stripe is provided on one side or double sides of the cards and information is written on the magnetic stripe at a high recording density so that the recorded information cannot be easily read out from the outside.

However, due to inherent properties of the magnetic stripe, the recorded information can be freely rewritten and erased, so that it is easy to forge or alter the data of the card. In this recent years, this has been brought to the fore as a large social problem. In particular, at the present time, since the magnetic stripe is easily available, it is easy to prepare a similar card. Further, when the magnetic stripe is exposed on the surface of the cards as in the conventional cards, there occurs a problem that the magnetic record information can be easily transferred to another magnetic stripe by magnetic transfer techniques.

For this reason, various means have been developed for preventing the forgery or alteration of the information recorded on the magnetic stripe. However, simple and effective means for preventing the forgery and alteration of the information recorded on the magnetic stripe has not been developed yet.

Under these circumstances, the present invention has been made, and an object of the present invention is to provide a plastic card provided with a magnetic stripe that is very difficult to forge and alter and, even when subjected to forgery or alteration, enables the forgery or alteration to be easily detected in appearance.

DISCLOSURE OF THE INVENTION

In order to attain the above-described object of the present invention, the present invention provides a plastic card provided with a magnetic stripe, comprising a card substrate of polyvinyl chloride and a hologram-magnetic stripe comprising, provided on said card substrate in the following order, an adhesive layer, a first magnetic recording layer, a second magnetic recording layer, a metallic reflecting layer and a hologram forming layer, said first magnetic recording layer and said second magnetic recording layer being such that one of said magnetic recording layers has a coercive force at least twice as high as the other magnetic layer and a Curie point at least 100° C. below the other magnetic layer and, when said magnetic recording layers are heated at a temperature in the range of from said lower Curie point to 30° C. below said lower Curie point, they become substantially identical to each other in saturation writing current value.

The first magnetic recording layer and the second magnetic recording layer provided on the card substrate to constitute a hologram-magnetic stripe are such that one of the magnetic recording layers has a coercive force at least twice as high as the other magnetic layer and a Curie point at least 100° C. below the other magnetic layer and, when said magnetic recording layers are heated at a temperature in the range of from said lower Curie point to 30° C. below said lower Curie point, they become substantially identical to each other in saturation writing current value. Therefore, after simultaneous writing on both the magnetic recording layers is effected with the magnetic recording layers heated in the above-described temperature range, it becomes difficult to effect simultaneous rewriting of magnetic information on both the magnetic recording layers by conventional magnetic recording devices and only the magnetic information on the magnetic recording layer having a lower coercive force can be rewritten. In this case, the illegally rewritten information on the magnetic recording layer having a lower coercive force becomes present together with the information recorded on the magnetic recording layer having a higher coercive force, which renders the readout of the information impossible, so that the forgery can be easily detected. Further, when the magnetic information on the magnetic recording layer having a higher coercive force can be rewritten by conventional magnetic recording devices, since the saturation writing current value of the magnetic recording layer having a higher coercive force is large, a writing current exceeding the saturation value of the output is applied to the magnetic recording layer having a lower coercive force, which results in a lowering in output of the magnetic recording layer having a lower coercive force. This renders the writing unsatisfactory, so that simultaneous rewriting of the magnetic information on both the magnetic recording layers and the forgery can be effectively prevented. Further, since the production of the transparent hologram constituting the hologram-magnetic stripe, as such, is not easy, it is difficult to prepare an imitation. Further, since the reflecting hologram is present on the magnetic recording layer, the magnetic recording layer is masked and, at the same time, exposure of the magnetic recording layer is prevented, which makes it difficult to directly transfer the information written on the magnetic layer to a magnetic stripe of another card.

PREFERRED EMBODIMENTS OF THE INVENTION

Embodiments of the present invention will now be described with reference to the accompanying drawings.

Figure 1:
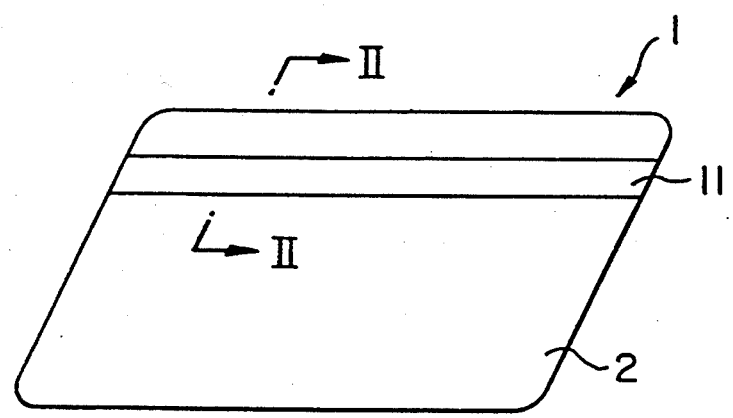
FIG. 1 is a plan view of an embodiment of the plastic card provided with a magnetic stripe according to the present invention.
Figure 2:
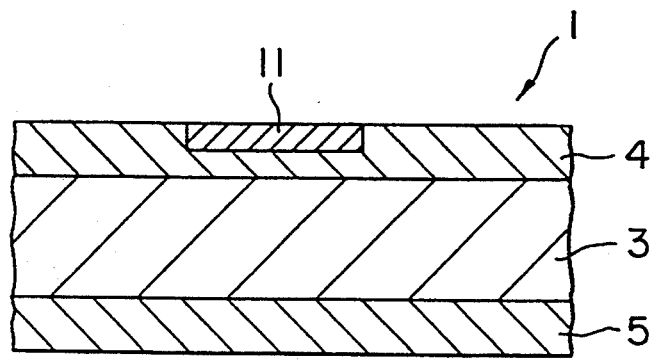
FIG. 2 is a cross-sectional view of the plastic card provided with a magnetic stripe taken on line II—II of FIG. 1.

FIG. 1 is a plan view of an embodiment of the plastic card provided with a magnetic stripe according to the present invention, and FIG. 2 is a cross-sectional view taken on line II—II of FIG. 1. In FIGS. 1 and 2, the plastic card 1 provided with a magnetic stripe according to the present invention comprises a card substrate 2 and a hologram-magnetic stripe 11 provided on the card substrate 2.

As shown in FIG. 2, the card substrate 2 has a laminate structure comprising a core 3 and oversheets 4, 5 respectively laminated on double sides of the core 3. In general, the core and the oversheets may comprise polyvinyl chloride by taking into consideration heat resistance, strength, rigidity, masking property, light impermeability and other properties required of the card substrate. For example, the card substrate 2 may comprise a 560 $\mu$m-thick core and 100 $\mu$m-thick oversheets to bring the thickness of the card substrate to about 760 $\mu$m.

Figure 3:
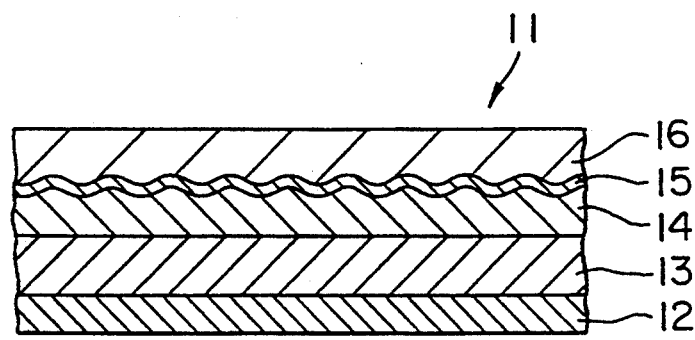
FIG. 3 is a schematic cross-sectional view of a structure of a hologram-magnetic stripe of the plastic card provided with a magnetic stripe shown in FIG. 1.

FIG. 3 is a schematic cross-sectional view showing a structure of the above-described hologram-magnetic stripe 11. The hologram-magnetic stripe 11 has a structure comprising an adhesive layer 12, a first magnetic recording layer 13, a second magnetic recording layer 14, a metallic reflecting layer 15 and a hologram forming layer 16 laminated on top of another in that order. It is fixed to the oversheet 4 of the card substrate 2 through the adhesive layer 12. The first magnetic recording layer 13 and the second magnetic recording layer 14 are characterized in that one of said magnetic recording layers has a coercive force at least twice as high as the other magnetic layer and a Curie point Tc at least 100° C. below the other magnetic layer and, when the magnetic recording layers are heated at a temperature in the range of from said lower Curie point Tc to 30° C. below the lower Curie point Tc, the saturation writing current value of the first magnetic recording layer 13 becomes substantially identical to that of the second magnetic recording layer 14. Therefore, the first magnetic recording layer 13 may be a magnetic recording layer having a higher coercive force and a lower Curie point with the second magnetic recording layer 14 being a magnetic recording layer having a lower coercive force and a higher Curie point. Alternatively, the construction may be reverse.

For example, when the first magnetic recording layer 13 is a magnetic recording layer having a higher coercive force and a lower Curie point Tc with the second magnetic recording layer 14 being a magnetic recording layer having a lower coercive force and a higher Curie point, the heating in the temperature range of from the Curie point Tc to a temperature 30° C. below the Curie point Tc to lower the coercive force of the first magnetic recording layer 13 as the magnetic recording layer having a higher coercive force so as to bring the saturation writing current value of the first magnetic recording layer 13 to substantially identical to that of the second magnetic recording layer 14 causes the coercive force of the second magnetic recording layer 14 as the magnetic recording layer having a lower coercive force to be also lowered if the Curie points of both the magnetic recording layers 13, 14 are close to each other. For this reason, as described above, the difference in Curie point between both the magnetic recording layers 13 and 14 is set to 100° C. or above to prevent a lowering in coercive force of the magnetic recording layer having a lower coercive force. Further, when the heating temperature is excessively low, since the saturation writing current value of the first magnetic recording layer 13 as the magnetic recording layer having a higher magnetic coercive force cannot be made identical to the saturation writing current value of the second magnetic recording layer 14, the lower limit of the heating temperature is set to a temperature 30° C. below the lower Curie point Tc. Further, the difference in coercive force between both the magnetic recording layers 13, 14 is such that the coercive force of one of the magnetic recording layers is at least twice as high as that of the other magnetic recording layer for the purpose of avoiding mutual influence between magnetic recordings recorded on the magnetic recording layers.

The hologram constituting the hologram-magnetic stripe 11 include a relief hologram wherein a light intensity distribution corresponding to a fringe of interference of the object light with the reference light is optically recorded in the form of a relief pattern and a diffraction grating wherein uneven portions are mechanically recorded with an electron beam drawing device.

Figure 4:
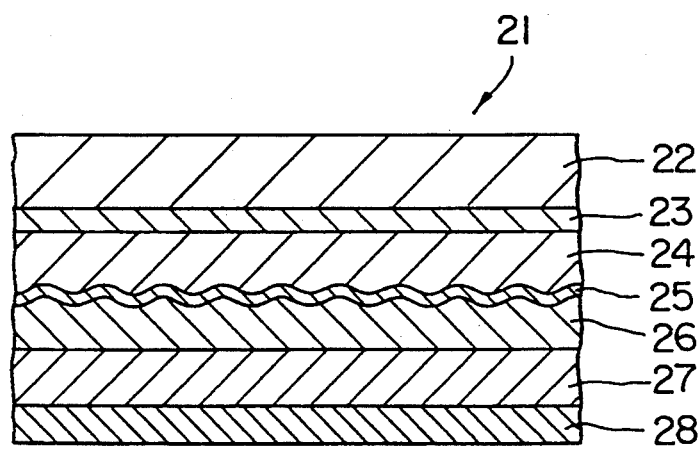
FIG. 4 is a schematic cross-sectional view of an embodiment of the transfer sheet that can be used in the production of the plastic card provided with a magnetic stripe according to the present invention.

A convenient method for providing the above-described hologram-magnetic stripe 11 on the card substrate 2 comprises preparing a transfer sheet 21 as shown in FIG. 4 and transferring the adhesive layer, the first magnetic recording layer, the second magnetic, the metallic reflecting layer and the hologram forming layer in that order on the card substrate 2 according to the conventional method.

The transfer sheet 21 shown in FIG. 4 is prepared by first forming a resin layer serving as a hologram forming layer on a base substrate 22 through a release layer 23 and forming a hologram relief pattern by a conventional method, such as thermocompression bonding onto a relief matrix, thereby forming a hologram forming layer 24. Then, a metallic reflecting layer 25 is formed on the hologram forming layer 24 by vacuum deposition, sputtering or other method, and a second magnetic recording layer 26 and a first magnetic recording layer 27 are formed on the metallic reflecting layer 25 by a printing method, a coating method or the like. Finally, an adhesive layer 28 is formed on the first magnetic recording layer 27.

The transfer sheet 21 thus prepared is subjected to thermocompression bonding (for example, under conditions of 150° C., 10 min and 100 kg/cm$^2$) so that the adhesive layer 28 is abutted against the oversheet 4 of the card substrate 2, and the base substrate 22 is peeled off by taking advantage of the release layer 23, whereby an adhesive layer 12, a first magnetic recording layer 13, a second magnetic recording layer 14, a metallic reflecting layer 15 and a hologram forming layer 16 can be provided on the card substrate 2.

Materials used in respective layers constituting the hologram-magnetic stripe 11 will now be described.

At the outset, the adhesive layer 12 may be formed by using known adhesives, such as an acrylic resin, a vinyl resin, a polyester resin, a urethane resin, an amide resin, an epoxy resin, a rubber resin and an ionomer resin. The thickness of the adhesive layer 12 may be approximately in the range of from 0.1 to 50 $\mu$m, preferably in the range of from 1 to 10 $\mu$m.

In the first magnetic recording layer 13 and the second magnetic recording layer 14 constituting the hologram-magnetic stripe 11, the magnetic recording layer having a higher coercive force and a lower Curie point Tc may comprise a magnetic material, for example, magnetic fine particles having a low Curie point, such as $CrO_2$, Sr ferrites and Ba ferrites, such as $AO.n\{(Fe_{1-x-y}Cr_xZn_y)_2O_3\}$, $AO.n\{(Fe_{1-x}Cr_x)_2O_3\}$, $AO.n\{(Fe_{1-x}Al_x)_2O_3\}$, $AO.n\{(Fe_{1-x}Ga_x)_2O_3\}$, $AO.n\{(Fe_{1-x-y-z}Ga_xCr_yAl_z)_2O_3\}$ and $AO.n\{(Fe_{1-x-y}Cr_x Ga_y)_2O_3\}$ wherein A represents at least one of Sr and Ba and n is 5 to 6 and Nd-Fe-B-base alloys, such as Nd-Fe-B-Mn, Nd-Fe-B-Mn-Al, Nd-Fe-B-Mn-Cr and Nd-Fe-Mn-Al-Cr. A dispersion of the above-described magnetic fine particles in a suitable resin or an ink vehicle may be coated by a known coating method, such as gravure coating, roll coating or knife edge coating, to form a magnetic recording layer.

On the other hand, the magnetic recording layer having a low coercive force and a high Curie point may comprise, for example, magnetic fine particles of $\gamma$-$Fe_2O_3$, Co-clad $\gamma$-$Fe_2O_3$, $Fe_3O_4$, Fe, Fe-Cr, Fe-Co, Co-Cr, Co-Ni, Ba ferrite and Sr ferrite. A dispersion of the above-described magnetic fine particles in a suitable resin or an ink vehicle may be coated by a known coating method, such as gravure coating, roll coating or knife edge coating, to form a magnetic recording layer. The magnetic recording layer may be formed also by using a metal or an alloy, such as Fe, Fe-Cr, Fe-Co or Co-Cr, or an oxide thereof according to vacuum deposition, sputtering, plating or other method.

A butyral resin, a vinyl chloride/vinyl acetate copolymer resin, a urethane resin, a polyester resin, a cellulosic resin, an acrylic resin, a styrene/maleic resin copolymer resin, etc. may be used as the resin or ink vehicle in which the magnetic fine particles are dispersed, and if necessary, a rubber resin, such as nitrile rubber, or a urethane elastomer may be added. If necessary, a surfactant, a silane coupling agent, a plasticizer, a wax, a silicone oil or a pigment, such as carbon, may be added to a dispersion of the magnetic fine particles in the resin or ink vehicle.

The thickness of the first magnetic recording layer 13 and the second magnetic recording layer 14 formed by using the above-described magnetic materials and resin or ink vehicle is approximately in the range of from 1 to 100 $\mu$m, preferably in the range of from 5 to 20 $\mu$m, when use is made of the coating method, and approximately in the range of from 100 Å to 1 $\mu$m, preferably in the range of from 500 to 2000 Å, when use is made of vacuum deposition, sputtering, plating or other method.

The metallic reflecting layer 15 serves to impart a reflecting property to the hologram forming layer 16 and is formed by using a metal such as Cr, Ti, Fe, Co, Ni, Cu, Ag, Au, Ge, Al, Mg, Sb, Pb, Pd, Cd, Bi, Sn, Se, In, Ga or Rb. Among these metals, Al, Cr, Ni, Ag, Au, etc. are particularly preferred.

The metallic reflecting layer may be formed on the hologram forming layer by preparing the above-described metal and forming a film using the metal on the hologram forming layer by a conventional method such as sputtering, vacuum deposition, ion plating or electroplating. The thickness of the metallic reflecting layer is preferably in the range of from 10 to 10000 Å, still preferably in the range of from 400 to 2000 Å.

Since the metallic reflecting layer 15 reflects most of the light incident on the hologram, the reproduced image of the hologram is bright, which not only contributes to an improvement in quality of design but also masks the magnetic recording layers 13 and 14 underlying the metallic reflecting layer 15.

Further, the presence of the metallic reflecting layer having a coefficient of thermal conductivity enables an uneven temperature distribution of the magnetic recording layer accompanying heating to be reduced in the magnetic recording.

In the plastic card provided with a magnetic stripe according to the present invention, a protective layer may be provided on the hologram forming layer 16. In the formation of the protective layer on the hologram forming layer 16, for example, when the hologram-magnetic stripe 11 is provided on the card substrate 2 using the transfer sheet 21, the protective layer may be provided between the release layer 23 and the hologram forming layer 24.

The formation of the protective layer on the release layer 23 in the transfer sheet 21 may be effected by lamination of a synthetic resin film, extrusion coating or coating of a synthetic resin coating. Various synthetic resins may be used as the resin constituting the protective layer by taking applications, adhesion to other layers, etc. into consideration. In particular, use of thermosetting synthetic resins is advantageous in that the high surface hardness can prevent contamination. Further, use of a coating containing an ultraviolet curing synthetic resin is preferred because curing can be instantaneously effected after coating. Further, releasability may be imparted to the surface by adding silicone or the like.

If necessary, an adhesive layer may be interposed between layers of the hologram-magnetic stripe 11. In this case, the adhesive layer may be formed by coating an adhesive layer coating prepared by sufficiently kneading a binder, such as a vinyl chloride/vinyl acetate copolymer, an ethylene/vinyl acetate copolymer, a vinyl chloride/propionic acid copolymer, a rubber resin, a cyanoacrylate resin, a cellulosic resin, an ionomer resin or a polyolefin copolymer with a solvent or a diluent optionally after addition of a plasticizer, a stabilizer, a curing agent or the like to the binder. The coating for an adhesive layer can be coated by gravure coating, roll coating, knife edge coating or other coating method. In particular, when the adhesive layer is provided on the magnetic recording layer, coating of a thermoplastic resin in the form of an emulsion followed by drying to form a heat sealing adhesive layer is preferred for the purpose of preventing redissolution of the magnetic recording layer.

In the plastic card 1 provided with a magnetic stripe according to the present invention, since the first magnetic recording layer 13 and the second magnetic recording layer 14 have the above-described properties, simultaneous writing on the first magnetic recording layer 13 and the second magnetic recording layer 14 becomes possible by effecting the heating in the temperature range of form the lower Curie point Tc to (Tc −30° C.) to bring the saturation writing current values of both the magnetic recording layers to substantially identical to each other.

However, it is difficult to simultaneously rewrite the magnetic information on the first magnetic recording layer 13 and the magnetic information on the second recording layer 14 by using a conventional magnetic recording device. Specifically, for example, when the first magnetic recording layer 13 is a magnetic recording layer having a higher coercive force with the second magnetic recording layer 14 being a magnetic recording layer having a lower coercive force, even though the magnetic information on the second magnetic recording layer 14 could be rewritten by a conventional magnetic recording device, since the illegally rewritten information on the second magnetic recording layer 14 is present together with the information recorded on the first magnetic recording layer 13, it is difficult to read out the information, so that the forgery can be easily detected.

On the other hand, even though the information recorded on the first magnetic recording layer 13 could be rewritten by a conventional magnetic recording layer, since the saturation writing current value of the magnetic recording layer having a higher coercive force is generally high, a higher writing current than the output saturation value is applied to the second magnetic recording layer 14 as the magnetic layer having a lower coercive force, there occurs a lowering in output of the second magnetic recording layer 14 which renders the writing unsatisfactory, so that it becomes impossible to simultaneously rewrite the magnetic information on both the magnetic recording layers, thus enabling the forgery to be effectively prevented.

Further, since the saturation writing current value varies depending upon coercive force, the thickness and filling ratio of magnetic material of the magnetic recording layers and the distance between the magnetic recording layers and the magnetic head, etc., the forgery of the hologram-magnetic stripe having an identical saturation writing current value, as such, is difficult. Moreover, it is very difficult to find out the above-described heating conditions and saturation writing current value. For example, a heating temperature deviation of 5° C. gives rise to a variation of 10% or more in saturation writing current value. Further, when the magnetic recording layer is constructed so as to provide such an output saturation characteristic curve that the current value changes greatly after it exceeds the saturation value, thereby narrowing the tolerance, it becomes impossible for the forger to find out the actual writing current value. Therefore, the plastic card provided with a magnetic stripe according to the present invention is best suited for use in credit cards and cash cards where the recorded information is not rewritten after issuance of the card.

Further, since the hologram is present on the magnetic recording layer, the magnetic recording layer is masked to prevent the magnetic recording layer from being exposed, so that it becomes difficult to directly effect magnetic transfer wherein the information written on the magnetic recording layer is directly transferred to a magnetic stripe of another card. Further, the hologram constituting the hologram-magnetic stripe has a beautiful appearance and, as such, is difficult to produce, so that it is difficult to prepare an imitation. Thus, the plastic card provided with a magnetic stripe according to the present invention is a plastic card with a magnetic stripe which is difficult to forge and alter.

EXAMPLE

The plastic card provided with a magnetic strip according to the present invention will now be described with reference to the following Example.

Example

Coating solutions having the following respective compositions were successively coated on one side of a 25 $\mu$m-thick polyester film to form a release layer (thickness: 1.0 $\mu$m) and a hologram forming layer (thickness: 3.0 $\mu$m) in that order on the polyester film, and a metallic reflecting layer (thickness: 0.06 $\mu$m) comprising aluminum (Al) was formed on the hologram forming layer. Further, coating solutions having the following respective compositions were successively coated on the metallic reflecting layer to form a second magnetic recording layer (thickness: 10 $\mu$m), a first magnetic recording layer (thickness: 10 $\mu$m) and an adhesive layer (thickness: 5 $\mu$m) in that order on the transparent continuous thin film layer to prepare a transfer sheet.

The hologram forming layer was formed as a relief hologram after the formation of a resin layer. The coating was effected by gravure coating.

| (Coating solution for formation of release layer) | |
|---|---|
| Cellulose acetate resin | 5 parts by weight |
| Methanol | 25 parts by weight |
| Methyl ethyl ketone | 45 parts by weight |
| Toluene | 25 parts by weight |
| Methylolated melamine resin | 0.5 part by weight |
| p-Toluenesulfonic acid | 0.05 part by weight |
| (Coating solution for formation of hologram) | |
| Acrylic resin | 40 parts by weight |
| Melamine resin | 10 parts by weight |
| Cyclohexanone | 50 parts by weight |
| Methyl ethyl ketone | 50 parts by weight |
| (Coating solution for formation of second magnetic recording layer) | |
| $\gamma$-$Fe_2O_3$ (Coercive force = 300 Oe, Curie point = 575° C.) | 36 parts by weight |
| Urethane resin | 12 parts by weight |
| Toluene | 20 parts by weight |
| Methyl ethyl ketone | 15 parts by weight |
| Methyl isobutyl ketone | 15 parts by weight |
| Isocyanate curing agent | 2 parts by weight |
| (Coating solution for formation of first magnetic recording layer) | |
| Sr ferrite (Coercive force = 6000 Oe, Curie point = 140° C.) | 36 parts by weight |
| Urethane resin | 12 parts by weight |
| Toluene | 20 parts by weight |
| Methyl ethyl ketone | 15 parts by weight |
| Methyl isobutyl ketone | 15 parts by weight |
| Isocyanate curing agent | 2 parts by weight |
| (Coating solution for formation of adhesive layer) | |
| Vinyl chloride/vinyl acetate copolymer | 20 parts by weight |
| Acrylic resin | 10 parts by weight |
| Ethyl acetate | 20 parts by weight |
| Toluene | 50 parts by weight |

The transfer sheet thus obtained was slit to a width of 12.7 mm to provide a transfer tape that was roll-transferred to a 100 $\mu$m-thick vinyl chloride sheet under conditions of 200° C. and 10 m/min. Thereafter, the polyester film was peeled off to provide a hologram-magnetic strip comprising, laminated on the vinyl chloride sheet in the following order, an adhesive layer, a first magnetic recording layer, a second magnetic recording layer, a metallic reflecting layer and a hologram forming layer. Then, a 560 $\mu$m-thick hard vinyl chloride core, on which letters and patterns had been printed by offset printing, was sandwiched between the above-described vinyl chloride sheet provided with a hologram-magnetic strip and another 100 $\mu$m-thick vinyl chloride sheet and, in this state, subjected to thermocompression bonding (150° C., 10 min, 100 kg/cm$^2$)

to provide an integral plastic card provided with a magnetic stripe according to the present invention.

The plastic card provided with a magnetic stripe thus prepared was heated at 120° C. to bring the saturation writing current values of the first magnetic recording layer and the second magnetic recording layer to about 60 mA, and in this state, magnetic information was recorded at a writing current of 80 mA. After the plastic card provided with a magnetic stripe was cooled, the magnetic information was read. As a result, the magnetic information was satisfactorily read at an output of about 500 mV.

Thereafter, another magnetic information was recorded at a writing current of 80 mA at room temperature on the plastic card provided with a magnetic stripe on which the above-described magnetic information had been recorded. Then, reading of the magnetic information was effected. As a result, although an output of about 400 to 600 mV could be obtained, reading of the magnetic information was unsuccessful because two kinds of information were present together.

Further, the plastic card provided with a magnetic stripe prepared above was heated at 100° C., and magnetic information was recorded at a writing current of 80 mA. The plastic card provided with a magnetic stripe was cooled, and the recorded magnetic information was read out. As a result, the reading output was about 300 mV, suggesting that recording of the magnetic information on the first magnetic recording layer as the magnetic recording layer having a higher coercive force was unsatisfactory.

Further, in the plastic card provided with a magnetic stripe prepared above according to the present invention, since a hologram is provided on the surface of the magnetic recording layer, the presence of a bright hologram with the metallic reflecting layer for a background could be apparently recognized at a glance. Further, deterioration in the effect of the hologram was not observed at all even after the above-described heating.

As described above in detail, according to the present invention, after the first magnetic recording layer and the second magnetic recording layer constituting the hologram-magnetic stripe are heated in the temperature range of the Curie point of the magnetic recording layer having a lower Curie point to 30° C. below the lower Curie point to bring the saturation writing current value of both the magnetic recording layers to a substantially identical value and simultaneous writing of magnetic information on both the magnetic recording layers is effected, it becomes difficult to effect simultaneous rewriting of the magnetic information on both the magnetic recording layer by using conventional magnetic recording devices. Further, since the saturation writing current value varies depending upon coercive force, the thickness and filling ratio of magnetic material of the magnetic recording layers and the distance between the magnetic recording layers and the magnetic head, etc., the forgery of the hologram-magnetic stripe having an identical saturation writing current value, as such, is difficult. Moreover, it is very difficult to find out the above-described heating conditions and saturation writing current value. Thus, the present invention can provide a plastic card provided with a magnetic stripe that is suitable for use in applications where the magnetic information is not rewritten after issuance, has a beautiful appearance by virtue of the provision of a hologram and is difficult to forge and alter.

What is claimed is:

1. A plastic card provided with a magnetic stripe, comprising a card substrate of polyvinyl chloride and a hologram-magnetic stripe comprising, provided on said card substrate in the following order, an adhesive layer, a first magnetic recording layer, a second magnetic recording layer, a metallic reflecting layer and a hologram forming layer, said first magnetic recording layer and said second magnetic recording layer being such that one of said magnetic recording layers has a coercive force at least twice as high as the other magnetic layer and a Curie point at least 100° C. below the other magnetic layer and, when said magnetic recording layers are heated at a temperature in the range of from said lower Curie point to 30° C. below said lower Curie point, they become substantially identical to each other in saturation writing current value.

* * * * *